United States Patent [19]

Munro et al.

[11] Patent Number: 5,012,248

[45] Date of Patent: Apr. 30, 1991

[54] RADAR ABSORPTION MATERIAL THICKNESS TESTING DEVICE

[75] Inventors: John R. Munro; William R. Jost, both of Simi Valley; Francis M. Ash, Jr., Burbank, all of Calif.

[73] Assignee: Lockheed Corporation, Calabasas, Calif.

[21] Appl. No.: 35,280

[22] Filed: Apr. 3, 1987

Related U.S. Application Data

[63] Continuation of Ser. No. 566,260, Dec. 28, 1988, abandoned.

[51] Int. Cl.$^5$ .............................................. G01S 13/34
[52] U.S. Cl. ...................................... 342/22; 342/128; 342/124
[58] Field of Search ............... 342/165, 173, 175, 176, 342/200, 118, 124, 128, 22

[56] References Cited

U.S. PATENT DOCUMENTS

| | | | |
|---|---|---|---|
| 4,044,353 | 8/1977 | Levy | 342/124 |
| 4,161,731 | 7/1979 | Barr | 342/22 |
| 4,415,898 | 11/1983 | Gaunaurd et al. | 342/124 X |
| 4,458,530 | 7/1984 | Bastida | 342/124 X |
| 4,503,433 | 3/1985 | Tomasi | 342/87 |

Primary Examiner—Thomas H. Tarcza
Assistant Examiner—John B. Sotomayor
Attorney, Agent, or Firm—Louis L. Dachs

[57] ABSTRACT

The invention is a device for determining the thickness of radar absorption material coatings. The device comprises a radiating element assembly 22 for transmitting RF energy to and recovering reflected RF energy from the coating. A source of frequency modulated RF signal, including an FM ramp generator assembly 11, buffer amplifier assembly 13 and Gunn oscillator 16, is provided. A ferrite circulator 20 is adapted to direct the source of modulated RF signal to the radiating element assembly 22 and the reflected RF energy to a detector assembly. The detector assembly includes a Schottky detector 24, a video amplifier assembly 40, a converter/driver assembly 42, and a digital display 44, and is adapted to sense the reflected RF energy from the coating and provide a visual display in the form of a voltage inversely proportional to the amount of the reflected RF energy. A portable power supply 10 is coupled to the detector assembly and the source of modulated RF signal to provide appropriate electrical power thereto.

5 Claims, 3 Drawing Sheets

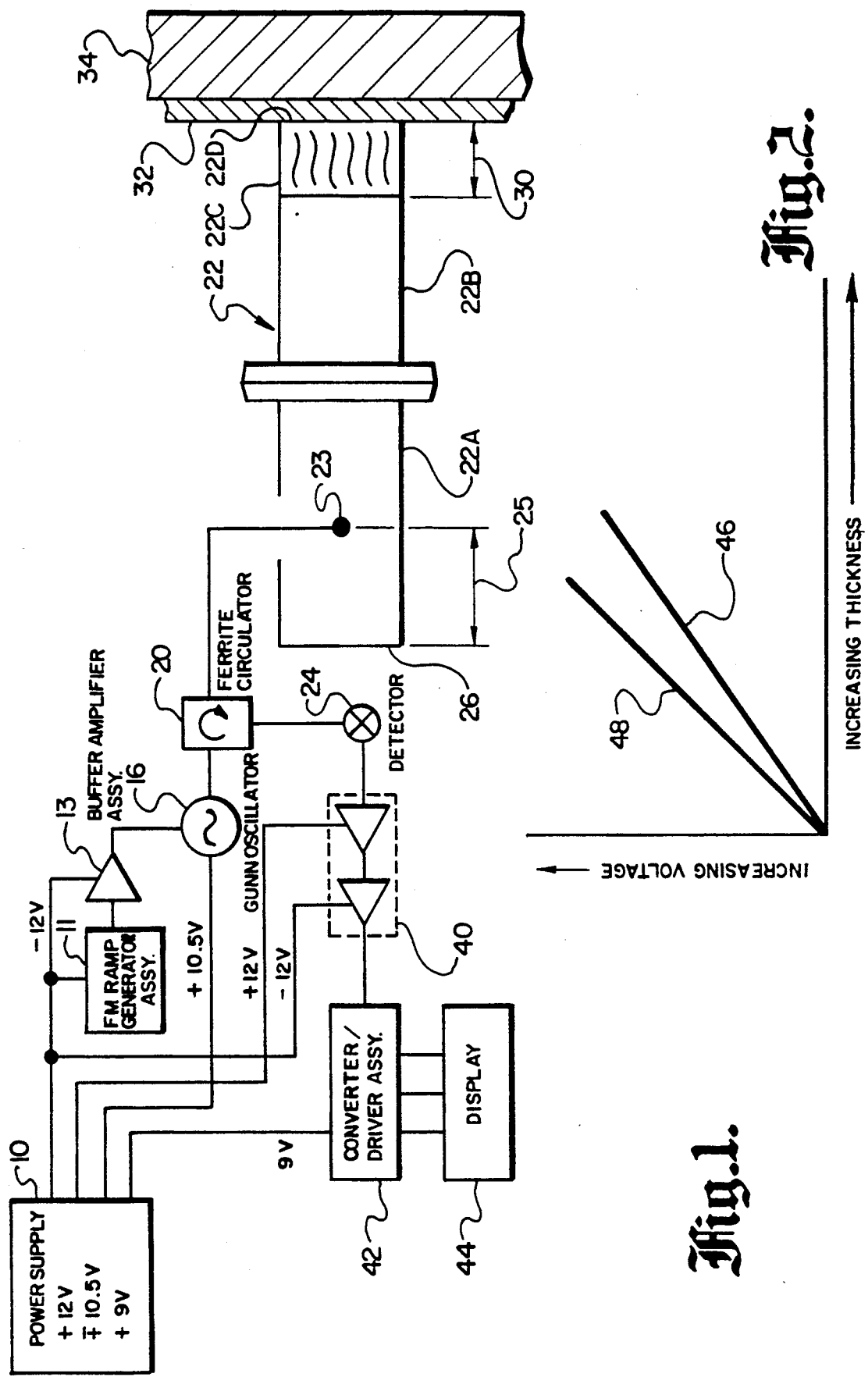

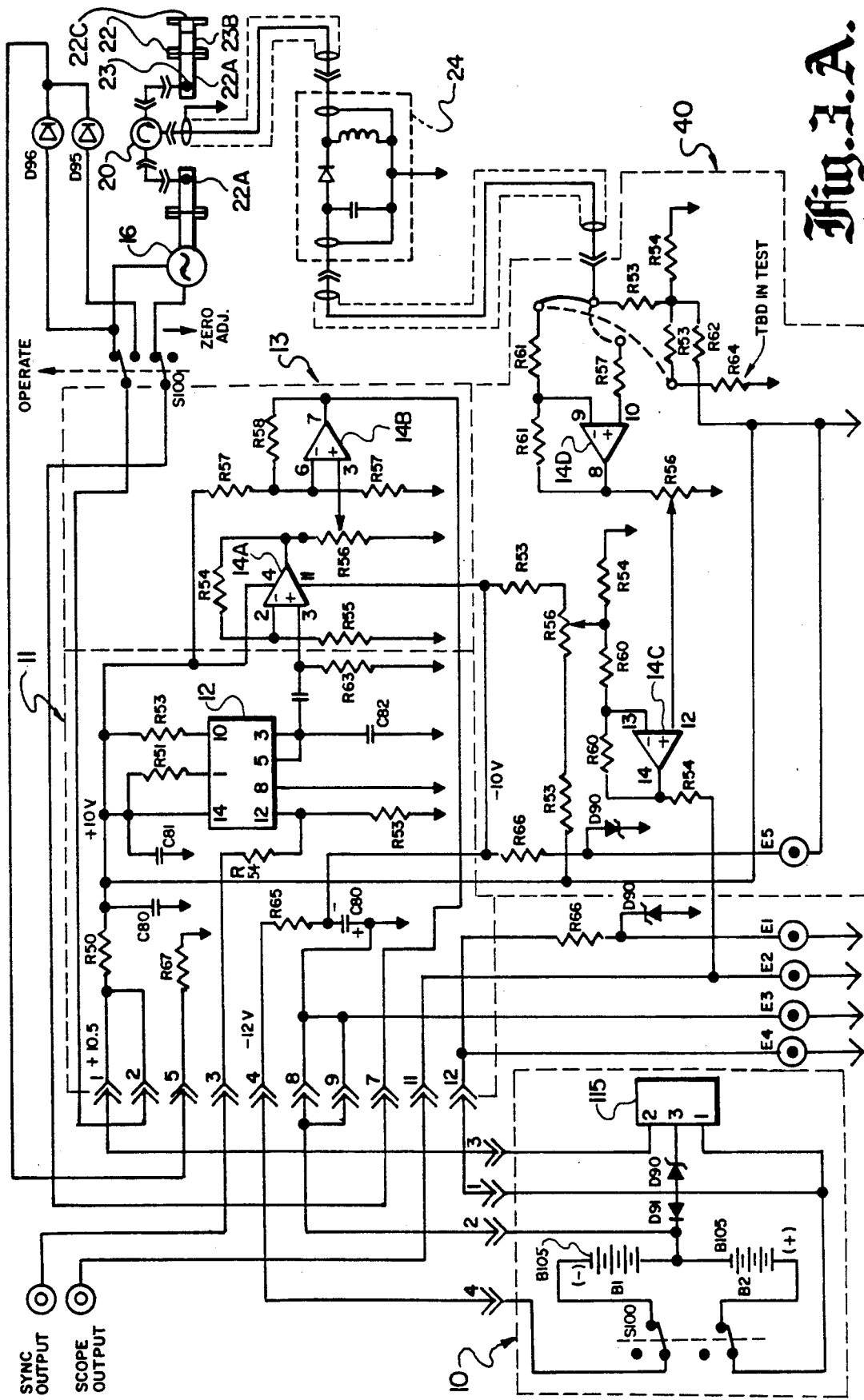

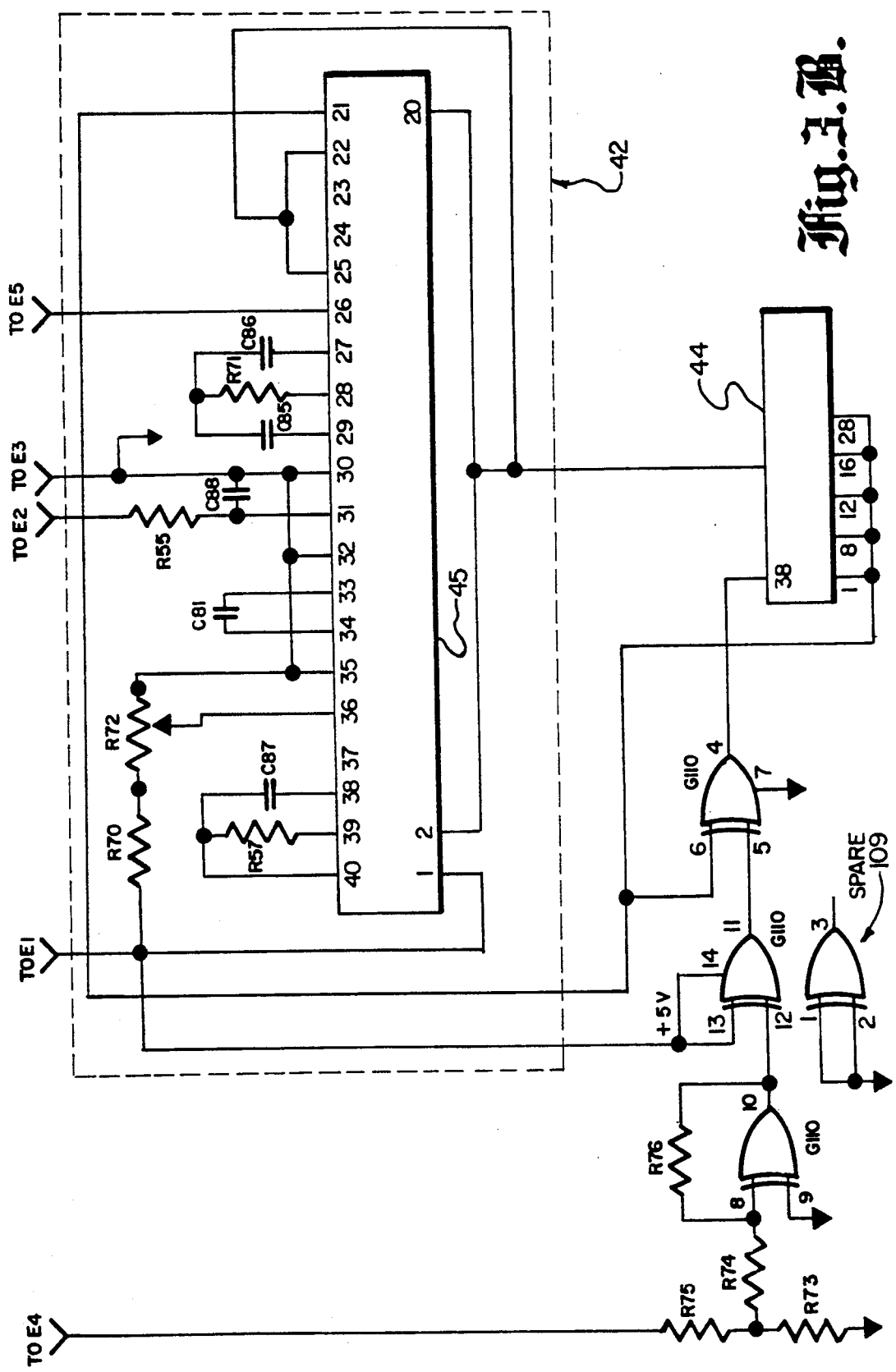

RADAR ABSORPTION MATERIAL THICKNESS TESTING DEVICE

This is a continuation of co-pending application Ser. No. 566,260 filed on Dec. 28, 1983, now abandoned.

TECHNICAL FIELD

The invention relates to the field of thickness testing devices and, in particular, to a device for determining the thickness of radar absorption material coatings.

BACKGROUND ART

The reduction in the radar signature of an aircraft has obvious military advantages. This can generally be accomplished in two ways. The first is active electronic countermeasures which jam, disrupt, or otherwise confuse the reflected signal. The second method is to use passive techniques which basically divide into two categories: (1) the shape of the aircraft and (2) the use of radar absorption material coatings, and those coatings in combination with substrate structures which also absorb the incoming radar signal and reflect back only a small portion of that signal.

With any radar absorption material (hereafter called RAM), the amount of absorption is proportional to the thickness of the coating. Thus, once the required degree of absorption is established, it is only necessary to ensure that the proper coating thickness has been applied to the aircraft. Therefore, any device that is to be used to test for the thickness of the coating should be small, compact, and hand holdable so that an individual can easily move it across the skin of the aircraft. Because most aircraft have complex contours, the testing device should also have a relatively small sensing head so as to be capable of following these contours. Since it is quite likely that the testing device will be used in the "field", it is also important that the device be portable and, wherever possible, "off-the-shelf" parts should be used to shorten repair times.

Measuring coating thickness is very important, especially when the coating is applied over a metal substrate, for most metals have little, if any, absorptive capability. Sometimes the coating is applied over substrates that are at least partially absorptive themselves. Thus, it is also important that the device be capable of measuring the total absorption level (coating and substrate) as well as the coating thickness alone.

One of the primary devices used to measure a non-conductive coating on a metal substrate is the well-known eddy current measuring device. The theory behind this device is well known and its details need not be discussed herein. In operation, the strength of the eddy current field stimulated in the metallic substrate decreases as the spacing between the probe and metal surface increases. Thus, a measurement of a non-conductive coating on a metal substrate can easily be obtained. But, such a device is limited to use with metal substrates and non-conductive coatings. Also, it would not be effective in measuring the aborption characteristics of a RAM coating applied over a substrate which also absorbs radar energy.

Various ultrasonic techniques are available to measure the thickness of coatings, but such devices require a coupling agent, usually water, which makes their use in the field, i.e., portability, limited. In addition, they can not measure the radar absorption characteristics of a combination coating and radar absorbing substrate.

Other apparatus of interest can be found in U.S. Pat. No. 3,988,582, "Blown Film Thickness Gauge" by R. W. Harman. Harman discloses an apparatus for measuring the thickness of plastic film as it is produced by a blown film-making machine. A radiation source and detector are placed on one side of the plastic film while a metal member is placed on the opposite side. The detector receives fluorescent X-rays from the metal member produced by a source of protons. The intensity of the scattered source of protons vary as a function of film thickness and with the intensity of the fluorescent X-rays. It is obvious that such an apparatus is unusable to measure the RAM coating thickness or the effectiveness of a RAM coating and substrate.

Another device of interest is disclosed in U.S. Pat. No. 4,042,723, "Method for Monitoring the Properties of Plastic Coatings on Optical Fibers" by H. M. Presby. The uniformity and concentricity of plastic coatings on an optical fiber are monitored by comparing the backscattered light patterns generated by two mutually perpendicular light beams incident upon the coated fiber. Unfortunately, this apparatus can only detect the thickness of optically clear material. It would have no application in determining the thickness of RAM coatings or the effectiveness of RAM coatings and substrate combinations.

Listed below are patents uncovered in a search of the prior art. They mainly deal with the measurement of the thickness of coatings by means of X-ray, gamma, or beta radiation, which generally depend upon monitoring backscatter to determine the thickness. None is felt to be relevant.

| Pat. No. | Title and Inventor |
| --- | --- |
| 3,076,894 | Gamma Ray Thickness Gauges by J. L. Putman, et al. |
| 3,115,577 | Measuring Table for use in Coating Thickness Measuring by B. B. Joffe, et al. |
| 3,497,691 | Dual Mode Fluorescence and Backscatter Coating Thickness Measuring Gauge by Y. M. Chen |
| 3,854,042 | Device for Measuring the Thickness of Layers with a Radionuclide Irradiating the Layer by A. Ott |
| 4,047,029 | Self-Compensating X-ray or X-ray Thickness Gauge by J. J. Allport |

Therefore, it is a primary object of the subject invention to provide a device to measure the thickness of a RAM coating.

It is a further object of the subject invention to provide a RAM coating thickness testing device that is portable and can be easily used to check the thickness of a coating on an aircraft surface.

A still further object of the subject invention is to provide a RAM coating thickness testing device that primarily makes use of standard parts.

Another object of the subject invention is to provide a RAM coating thickness testing device that can measure the effectiveness of both the coating and substrate upon which the coating is applied.

DISCLOSURE OF INVENTION

The invention is a device for determining the thickness of radar absorption material coatings. It comprises a radiating element assembly for transmitting radio frequency energy to and receiving reflected radio frequency energy from the coating. A source of frequency modulated radio frequency signal is provided. A circulating means is coupled to the radiating element assembly, a detector means, and the source of the frequency modulated radio frequency signal. The circulating means is adapted to direct the source of radio frequency modulated radio frequency signal to the radiating element assembly and the reflected energy to a detector means. The detector means is adapted to sense the reflected energy from the material to provide a display of a voltage inversely porportional to the amount of the reflected energy.

Finally, a portable power means is coupled to the detector means and the source of frequency modulated radio frequency signal to provide appropriate power to these components.

The novel features which are believed to be characteristic to the invention, both as to its organization and method of operation, together with further objects and advantages thereof, will be better understood from the following description in connection with the accompanying drawings in which a presently preferred embodiment of the invention is illustrated by way of example. It is to be expressly understood, however, that the drawings are for purposes of illustration and description only, and are not intended as a definition of the limits of the invention.

BRIEF DESCRIPTION OF DRAWINGS

Illustrated in FIG. 1 is a simplified schematic of the RAM coating thickness testing device.

Illustrated in FIG. 2 is a typical calibration graph indicating the thickness of the coating as a function of the voltage produced by the testing device.

Illustrated in FIGS. 3A and 3B is a detailed schematic of the RAM coating thickness testing device.

BEST MODE FOR CARRYING OUT THE INVENTION

Referring to FIGS. 1 and 3A and 3B, it can be seen that portability of the testing device is achieved in part by using a battery-pack power supply 10. Suitable batteries for the power supply are model GC 1215 Gel/-Cell batteries (indicated in FIG. 3A as B105) manufactured by the Globe Corporation, Battery Division, Johnson Controls, Milwaukee, Wis., or equivalent.

The power supply 10 is electrically coupled to an FM ramp generator assembly 11. To develop a more constant radio frequency (hereafter abbreviated to RF) output that can be used as a reference energy level, frequency modulation of the carrier is provided. The average reading of the reflected narrow frequency energy band is then used, rather than the carrier frequency, thus improving measurement accuracy. A suitable FM ramp generator assembly 11, that can be used as a modulator, includes a timer 12, model XR-320, manufactured by the Exar Corporation, Sunnyvale, Calif., or equivalent. The power supply 10 is also coupled to a buffer amplifier assembly 13 which receives the output signal from the FM ramp generator assembly 11. The buffer amplifier assembly 13 provides isolation and matching impedance between the FM ramp generator assembly 11 and a Gunn oscillator 16. A suitable buffer amplifier assembly 13 includes a quadoperational amplifier 14 (amplifier 14A and 14B) model LM 324 manufactured by Texas Instruments, Dallas, Tex., or equivalent.

The Gunn oscillator 16 is also powered by the power supply 10, and it receives the output signal from the buffer amplifier assembly 13. The Gunn oscillator 16 provides a source of RF energy in the X-band frequencies. The RF energy signal is modulated by the amplified FM ramp signal from the ramp generator 12 and buffer amplifier 13 so that it can be used as a reference energy level, i.e., flucuations in the input voltage and temperature variations, etc. are damped out. This type of oscillator consists of a single-structured crystal assembly which, when mounted in a tunable microwave cavity, will sustain self-oscillation. A model MA-87602 Gunn oscillator manufactured by Microwave Associates, Burlington, Mass., or equivalent, is suitable for use in this testing device. The FM ramp generator assembly 11, buffer amplifier assembly 13, and Gunn oscillator 16 constitute a source of frequency modulated RF signal.

The output of the Gunn oscillator 16 is coupled to a ferrite circulator 20. The ferrite circulator 20 directs the RF energy from the Gunn oscillator 16 to radiating element assembly 22. It also directs reflected energy (to be described) back through the radiating element assembly 22 into an RF detector 24. The ferrite circulator 20 is essentially a three-port, ferrite-based waveguide junction in which internal ferrite slugs at the junction slew the magnetic field so that the the RF energy is directed to the desired port. A typical ferrite circulator device which can be used in this testing device is model 1083CX manufactured by INOWAVE INC., Sunnyvale, Calif., or equivalent.

The output from the ferrite circulator 20 is fed by co-ax cable to radiating element assembly 22. Radiating element assembly 22, in reality, is a quarter-wave transformer, i.e., radiating element 23 is placed at a distance of one-fourth of a wave length, as designated by numeral 25, from the rear wall 26. Impedance matching is provided at the outlet of the assembly 22 for the purpose of cancelling reflections from a front surface of the RAM coating to be measured. This impedance matching is accomplished by use of a dielectic material 22C having a contact surface 22D, also having a thickness 30 equal to one-fourth the wave length of the radiated energy. A suitable dielectic material for use in this application is Rexolite 1422, manufactured by the Brand-Rex Corporation, Willimantic, Conn., or equivalent. The contact surface 22D of the radiating element assembly 22 is physically placed against the RAM coating 32 covering the nonabsorbing structure 34 when testing for thickness.

Some of the energy radiated from the radiating assembly 22 will be absorbed by the RAM coating 32. The radiation that is not absorbed will be reflected back to the radiating element 22 and, tbereafter, to the ferrite circulator 20. But the ferrite circulator 20 is so configured that the reflected RF energy will be directed to the detector 24. The detector 24 is, preferably, a Schottky detector where the reflected RF energy is converted to a negative DC voltage. The detector 24 must have a high sensitivity and a flat response in the frequency range used. A suitable detector is model number MA 7709A-0007 manufactured by Microware Associates, Burlington, Mass., or equivalent.

As previously mentioned, the RF signal is modulated by the FM ramp signal but the rate is so much faster than the response time of the detector 24, the detector only senses an average voltage. Thus, any aforementioned RF signal changes due to input voltage shifts, temperature shifts, etc. are damped out.

The output from the detector 24 is coupled to a video amplifier assembly 40, which is required in order to boost the negative going output voltage from the detector 24 to a positive value that can be used to drive a converter/driver assembly 42. A video amplifier assembly 40 which has been found suitable is a model number LM358 manufactured by Texas Instruments, Dallas, Tex., or equivalent. However, since the LM324 amplifier used in the buffer amplifier assembly 13 is a quad-operational amplifier, third and fourth amplifiers (14C and 14D) therein have been used in place of the LM358 amplifier.

The output from the video amplifier assembly 40 is, in turn, coupled to the aforementioned converter/driver assembly 42. The assembly 42 converts the amplified analog signal received from the amplifier assembly 40 to a digital signal, decodes it and applies voltages to the proper pins on a digital display 44. A suitable converter/driver assembly 42 includes a converter/driver 45 model 1CL7106 manufactured by Intersil Inc., Cuppertino, Calif., or equivalent. It is available on a single-integrated chip which contains seven segment decoders, display drivers, and a source of reference and clock voltages.

Finally, the output from the converter/driver assembly 42 is coupled to the digital display unit 44. The device selected for use in the testing device is a 3½ digital readout that indicates the voltage level of the reflected signal. A preferred device is model number LCD5679 manufactured by Industrial Electronic Engineering, Van Nuys, Calif., or equivalent. The detector 24, video amplifier assembly 40, converter/driver assembly 42, and digital display 44 form a detector means.

With the preferred components mentioned above, it will be apparent to those skilled in the art that the time constant of the detector means is much slower than the frequency modulation rate of the oscillator, and thus the detector means (and what is actually displayed) provides an average power reading. Thus, when the oscillator is frequency modulated it is for the purpose of overcoming the power output instability with frequency and not for the purposes of generating "a product" at the detector output.

Referring now to FIG. 2, it can be seen that different RAM coatings, indicated by numerals 46 and 48, will have characteristic curves which generally show an increase in voltage as thickness of the coating increases. These curves can be easily developed by applying coatings of different thicknesses on test specimens, mechanically measuring the thickness and, thereafter, obtaining a reading using the testing device. Thus, with the required coating thicknesses known, the voltage limits allowable can be determined from the chart. Thereafter one need only run the device over the surface of the aircraft and any reading above or below the specified voltage limits will indicate a coating thickness more or less than required.

If the substrate upon which the coating is applied is also capable of absorbing radar energy, to determine the thickness of the coating it is first necessary to determine the absorptive characteristics of the substrate prior to applying the coating. Coating thickness can then be determined from the reading obtained for the coating/substrate combination. Of course, if the overall effectiveness of the coating/substrate combination is desired, a direct reading is taken.

It is readily apparent that the main components of the testing device are "off-the-shelf", and that the wiring together thereof would also be apparent to those skilled in the art, given the foregoing descriptions and explanations (although the particular combination of main components in the circuit is far from apparent). Nevertheless, as an aid to those wishing to practice the invention, a detailed schematic is provided in FIG. 3A and 3B, along with a listing of the components, their value and sources, where necessary, in Table I.

TABLE I

| No. | Item | No. | Item |
|---|---|---|---|
| R50 | 10 ohm* | R67 | 866 ohm |
| R51 | 56 K ohm* | R70 | 1.5 K ohm* |
| R53 | 10 K ohm* | R71 | 470 K ohm* |
| R54 | 1 K* | R72 | 25 K Trimpot |
| R55 | 1 M ohm* | R73 | 3.32 K ohm ± 1% NOM |
| R56 | 10 K ohm Trimpot | R74 | 1.2 K ohm |
| R57 | 100 K ohm* | R75 | 10 K ohm |
| R58 | 47 K ohm* | R76 | 120 K ohm |
| R59 | 860 ohm* | C80 | 10 micro f - 20V - 10% |
| R60 | 820 K ohm* | C81 | 0.1 micro f - 100V - 10% |
| R61 | 120 K ohm* | C82 | 0.01 micro f - 200V - 10% |
| R62 | 12 K ohm* | C83 | 1.0 micro f - 50V - 10% |
| R63 | 560 K ohm* | C85 | 0.47 micro f - 100V (Mylar) |
| R64 | to be determined in test | C86 | 0.22 micro f - 700V (polyprop) |
| R65 | 12 ohm | C87 | 100 pf - 300V - 5% (Mica) |
| R66 | 390 ohm | C88 | 0.01 micro f - 500V |
| D90 | IN751A Zener Diode | | |
| D91 | IN4001 Rectifier Diode | | |
| B105 | GC1215 GEL/CELL, Globe Battery Division, Johnson Controls, Milwaukee, Wisconsin | | |
| S100 | Double pole - double throw switch | | |
| G110 | MC 140 70BCP And gates | | |
| 115 | 5 volt regulator | | |
| 12 | X R-320 timer XR Corporation, Sunnyvale, Calif. (used as FM ramp generator assembly) | | |
| 14 | LM 324 Quad-operational amplifier (amplifiers 14A and 14B used as buffer amplifier assembly) Amplifiers 12C and 12D used as a substitute for video amplifier 40, i.e., LM 358, Texas Instruments, Dallas, Texas | | |
| 16 | MA 87602 Gunn Oscillator Microwave Associates, Burlington, Mass. | | |
| 20 | Model 1083CX Ferrite Circulator Inowave Corp., Sunnyvale, California | | |
| 22 | Radiating element assembly | | |
| 22A | OSM-2000-6264-00 adapter waveguide - COAX | | |
| 22B | Waveguide impedance matching head | | |
| 22C | Waveguide impedance matching transformer (dielectric material) Rexolite 1422 manufactured by Brand-Rex Corporation, Willimantic, Conn. | | |
| 24 | MA-7709A-0007 Schottky detector, Microwave Associates, Burlington, Mass. | | |
| 45 | ICL 7106 converter/driver Intersil, Inc., Cupertino, California | | |
| 44 | LCD5679R25H Liquid crystal Display Industrial Electronics Engineering Inc., Van. Nuys, California | | |

*¼ watt - 5%

Note that because the buffer amplifier assembly 13 includes a model LM324 quad-operational amplifier, the remaining two amplifiers 14C and 14D were substituted for the separate video amplifier assembly 40 (LM358). Thus, as previously stated, the actual method of coupling of the various major components together can vary. In addition, the schematic in FIGS. 3A and 3B also incorporates a battery test circuit, generally designated by numeral 109, and light emitting diodes to indicate both "on" or "off" and when the testing device is actually measuring the thickness of the coating. The value of resistor R64 is determined during final assembly to establish the optimum bias level applied to the detector to assure a low voltage standing wave ratio.

While the invention has been described with reference to a particular embodiment, it should be understood that the embodiment is merely illustrative as there are numerous variations and modifications which may be made by those skilled in the art. Thus, the invention is to be construed as being limited only by the spirit and scope of the appended claims.

Industrial Applicability

The invention has application in the area of determining the thickness of RAM coatings.

We claim:

1. A device for determining radar absorption material coating thickness comprising:
    a radiating element assembly for transmitting RF energy to and receiving reflected RF energy from said material;
    detector means coupled to said radiating element adapted to sense said reflected RF energy from said coating and provide a visual display in the form of a voltage representative of the amount of said reflected RF energy said detector means having a time constant;
    a source of frequency modulated RF signal said frequency modulated RF signal at a frequency significantly higher than said time constant of said detector means;
    circulating means coupled to said radiating element, detector means, and said source of frequency modulated RF signal, said circulating means adapted to direct said source of RF modulated RF signal to said radiating element assembly and said reflected RF energy to said detector means; and
    power means coupled to said detector means and said source of frequency modulated RF signal.

2. The device as set forth in claim 1 wherein said source of RF energy comprises:
    an FM ramp generator assembly;
    a buffer amplifier assembly coupled to the output of said FM ramp generator assembly; and
    a Gunn oscillator coupled to the output of said buffer amplifier assembly, said output of said Gunn oscillator coupled to said circulating means.

3. The device as set forth in claim 2 wherein said circulator means is a ferrite circulator.

4. The device as set forth in claim 3 wherein said detector means comprises:
    a Schottky detector coupled to said ferrite circulator;
    a video amplifier assembly coupled to said Schottky detector;
    a convertor/driver assembly coupled to said video amplifier assembly; and
    a digital display coupled to said convertor/driver assembly.

5. A device as set forth in claim 1 wherein the material is a radar absorbing material coating over a radar absorbing substrate, therefore, making the degree of radar absorbtion proportional to the thickness of both said coating and said substrate.

* * * * *